United States Patent
Liang et al.

(10) Patent No.: US 12,070,913 B1
(45) Date of Patent: Aug. 27, 2024

(54) METHOD FOR MANUFACTURING STORAGE CONTAINERS BY SPIRALLY WINDING WITH MULTIPLE BUNDLES OF FIBERS

(71) Applicant: Taiyuan University of Technology, Taiyuan (CN)

(72) Inventors: Jianguo Liang, Taiyuan (CN); Yujie Duan, Taiyuan (CN); Qingxue Huang, Taiyuan (CN); Jun Feng, Taiyuan (CN); Jianglin Liu, Taiyuan (CN); Lianyun Jiang, Taiyuan (CN); Xinyu Wen, Taiyuan (CN); Zhanchun Chen, Taiyuan (CN); Jianhua Hu, Taiyuan (CN); Zhaotun Jia, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/508,752

(22) Filed: Nov. 14, 2023

(30) Foreign Application Priority Data

Sep. 20, 2022 (CN) .......................... 202211140383.3

(51) Int. Cl.
*B29C 70/24* (2006.01)
*B29C 53/56* (2006.01)
(Continued)

(52) U.S. Cl.
CPC ............ *B29C 70/24* (2013.01); *B29C 53/562* (2013.01); *B29C 70/30* (2013.01); *B29C 70/34* (2013.01);
(Continued)

(58) Field of Classification Search
CPC ................................................... B29C 53/562
See application file for complete search history.

(56) References Cited

U.S. PATENT DOCUMENTS 4,172,562 A * 10/1979 Smith ................. B29C 53/8016
156/169
5,203,249 A * 4/1993 Adams ..................... D04C 3/36
87/34
(Continued)

FOREIGN PATENT DOCUMENTS

CN   113211817 A * 8/2021 ............. B29C 70/30
CN   113211825 A * 8/2021 ........... B29C 70/382
(Continued)

OTHER PUBLICATIONS

First Office Action and Search Report issued in Chinese Application No. 202211140383.3; mailed Nov. 1, 2022; 16 pgs.
(Continued)

*Primary Examiner* — Atul P. Khare
(74) *Attorney, Agent, or Firm* — HAUPTMAN HAM, LLP

(57) ABSTRACT

This application describes a method for manufacturing storage containers by spirally winding with multiple bundles of fibers. Two sets of yarn guide nozzles distributed in a circumferential array form a first spiral winding structure and a second spiral winding structure respectively, and a spiral winding device with the two layers of spiral winding structures cooperates with feeding devices carrying wound containers, to realize the spiral winding of the multiple bundles of fibers on the wound containers; the feeding devices drive the wound containers to do axial reciprocating motion and axial rotation, and the spiral winding device drives the yarn guide nozzles to do radial telescopic motion and self-rotation motion; and according to the lengths of axial dimensions of the wound containers, single-station double-layer spiral winding or double-station single-layer spiral winding is selected.

7 Claims, 5 Drawing Sheets

(51) Int. Cl.
*B29C 70/30* (2006.01)
*B29C 70/34* (2006.01)
*B29C 70/54* (2006.01)
*B29L 22/00* (2006.01)
*B29L 31/00* (2006.01)

(52) U.S. Cl.
CPC ....... *B29C 70/545* (2013.01); *B29L 2031/712* (2013.01)

(56) References Cited

U.S. PATENT DOCUMENTS

| | | | |
|---|---|---|---|
| 9,636,874 B2 * | 5/2017 | Hatta | B29C 71/02 |
| 9,796,128 B2 * | 10/2017 | Tanigawa | B65H 59/32 |
| 10,087,042 B2 * | 10/2018 | Hatta | B65H 81/00 |
| 11,511,476 B1 * | 11/2022 | Liang | B29C 53/58 |
| 11,534,956 B1 * | 12/2022 | Liang | B29C 53/602 |
| 11,712,835 B2 * | 8/2023 | Liang | B29C 53/58 |
| | | | 156/425 |
| 11,794,401 B2 * | 10/2023 | Liang | B29C 53/602 |
| 11,795,029 B1 * | 10/2023 | Liang | B29C 53/602 |
| 2009/0038759 A1 * | 2/2009 | Uozumi | B29C 53/828 |
| | | | 156/425 |
| 2022/0388228 A1 * | 12/2022 | Liang | B65H 57/006 |

FOREIGN PATENT DOCUMENTS

| | | | | |
|---|---|---|---|---|
| CN | 113334749 A | * | 9/2021 | B29C 53/58 |
| CN | 115214167 A | * | 10/2022 | B29C 70/78 |
| CN | 115230201 A | * | 10/2022 | B29C 70/78 |

OTHER PUBLICATIONS

Notification to Grant Patent Right for Invention issued in Chinese Application No. 202211140383.3; mailed Nov. 23, 2022; 3 pgs.

* cited by examiner

METHOD FOR MANUFACTURING STORAGE CONTAINERS BY SPIRALLY WINDING WITH MULTIPLE BUNDLES OF FIBERS

RELATED APPLICATIONS

The present application claims priority from Chinese Application Number 202211140383.3, filed Sep. 20, 2022, the disclosure of which is hereby incorporated by reference herein in its entirety.

TECHNICAL FIELD

The present invention belongs to the technical field of fiber winding molding, and in particular relates to a method for manufacturing storage containers by spirally winding with multiple bundles of fibers.

BACKGROUND

As the development and rise of new energy industry has received concentrated attention and recognition, the most critical energy storage link in the complete industrial chain of different energy sources has also received more attention. A compression energy storage method is a common physical energy storage method. Compression energy storage structures are generally focused on a rotary structure and a spherical structure. With the gradual increase of application of a storage container structure in a civil field, the production and manufacture of the storage container put forward higher requirements for low cost and high efficiency of a production process as well as high strength and high fatigue life durability of a final product. In terms of the safety use requirements of high strength and high fatigue life of the storage container, the external surface of the storage container is mostly wound with fibers to improve its load-bearing performance.

At present, in numerous enterprises producing different storage containers, it is a research problem for manufacturers to develop a low-cost manufacturing technology for storage containers under the premise of ensuring the performance and safety use requirements of the storage container. In the low-cost manufacturing technology, a fiber resin winding molding process of external fiber composite materials is the most critical part related to the safety and reliability of the storage container. A fiber composite material layer is a main carrier of the storage container, and is the key to the reduction of the weight of the container (the decrease of the amount of raw materials used), high strength, and fatigue resistance. The current winding molding process of the storage container is relatively mature and mainly includes a spiral winding process and a hoop winding process.

In terms of structural strength, life and other performance of the storage container: at present, the fiber winding molding method of the storage container is mainly focused on single-bundle winding, and when the spiral winding is carried out according to the method, fibers in the same layer will cause stacking, crossing and uneven winding, resulting in local stress concentration in a final storage container and failure to maximize the fiber performance.

In terms of cost manufacturing technology for the storage container: at present, improving the production efficiency mainly depends on increasing the number of stations, multi-station synchronous winding requires higher hardware quality, and at the same time, limited by the space of winding equipment, the number of stations cannot be infinitely increased, the winding efficiency cannot be improved qualitatively, the production efficiency of the storage container is difficult to guarantee, and the stability of the molding performance is poor.

SUMMARY

The present invention provides a method for manufacturing storage containers by spirally winding with multiple bundles of fibers to solve the problems in the prior art that a single bundle of fibers will cause stacking, crossing and uneven winding, and the winding efficiency of existing winding equipment is low.

In order to achieve the above object, the present invention adopts the following technical solution: a method for manufacturing storage containers by spirally winding with multiple bundles of fibers is provided, where fiber tows are led out of yarn guide nozzles, and carry out spiral winding on the surfaces of wound containers; two sets of yarn guide nozzles distributed in a circumferential array constitute a first spiral winding structure and a second spiral winding structure respectively, and a spiral winding device with the two layers of spiral winding structures cooperates with feeding devices carrying the wound containers to realize the spiral winding of the multiple bundles of fibers on the wound containers; the feeding devices drive the wound containers to do axial reciprocating motion and axial rotation, and the spiral winding device drives the yarn guide nozzles to do radial telescopic motion and self-rotation motion; and according to lengths of axial dimensions of the wound containers, single-station double-layer spiral winding or double-station single-layer spiral winding is selected.

Preferably, when the axial dimension of one wound container is greater than the distance between the two layers of spiral winding structures, the single-station double-layer spiral winding is selected; and when the sum of the axial dimensions of the two wound containers is less than the distance between the two layers of spiral winding structures, the double-station single-layer spiral winding is selected.

Preferably, during the single-station double-layer spiral winding, the winding steps include:
S101: fixing two ends of the wound containers by central shaft rods of the feeding devices, and driving the wound containers to rotate and axially feed by the feeding devices, starting the spiral winding from first end sealing sections of the wound containers by the first spiral winding structure, and enabling the yarn guide nozzle of the first spiral winding structure to cooperate with the wound containers to carry out radial movement and self-rotation motion;
S102: when the first end sealing sections of the wound containers are moved to the second spiral winding structure, starting second layer of winding on the wound containers by the second spiral winding structure, enabling the yarn guide nozzle of the second spiral winding structure to cooperate with the wound containers to carry out radial movement and self-rotation motion, and winding by the first spiral winding structure to cylinder sections or second end sealing sections;
S103: continuing to carry out winding on the cylinder sections or the second end sealing sections by the first spiral winding structure until completing the winding of the second end sealing sections, thereby completing the first layer of spiral winding on the wound containers; and continuing to wind by the second spiral winding structure until completing the second layer of spiral winding on the wound containers;

S104: after the second layer of spiral winding of the wound containers is completed, driving the wound containers to start to move and rotate by a preset angle in opposite directions of the feeding directions of the first two layers of spiral winding by the feeding devices, and completing the third and fourth layers of spiral winding of the wound containers respectively by the second spiral winding structure and the first spiral winding structure, and completing the winding for the number of spiral winding layers in a setting process by parity of reasoning and reciprocating circulation; and S105: after all spiral winding are completed, cutting off the fiber tows.

Preferably, during the double-station single-layer spiral winding, the winding steps include:

S201: driving one wound container to rotate and axially feed respectively by the two feeding devices located on two sides of the spiral winding structure, starting the spiral winding from the first end sealing section of one of the wound containers by the first spiral winding structure, and starting the spiral winding from the first end sealing section of the other wound container by the second spiral winding structure;

S202: under the radial movement and self-rotation motion of the yarn guide nozzle of the first spiral winding structure, in cooperation with the rotation and axial feeding of the corresponding wound containers, completing the winding of the second end sealing sections of the wound containers by the first spiral winding structure, thereby completing the first layer of spiral winding of the wound containers, and changing the axial feeding directions of the wound containers into the opposite directions until completing the second layer of spiral winding of the wound containers by the first spiral winding structure; and under the radial movement and self-rotation motion of the yarn guide nozzle of the second spiral winding structure, in cooperation with the rotation and axial feeding of the corresponding wound containers, completing the winding of the second end sealing sections of the wound containers by the second spiral winding structure, thereby completing the first layer of spiral winding of the wound containers, and changing the axial feeding directions of the wound containers into the opposite directions until completing the second layer of spiral winding of the wound containers by the second spiral winding structure;

S203: completing the winding for the set number of spiral winding process layers of the two wound containers by parity of reasoning and reciprocating circulation; and S204: after all spiral winding are completed, cutting off the fiber tows.

Preferably, the spiral winding device further includes a rotary drive unit configured to drive the two sets of yarn guide nozzles to carry out synchronous self-rotation, a first radial driving unit configured to drive the yarn guide nozzle of the first spiral structure to synchronously and radially extend and retract, and a second radial driving unit configured to drive the yarn guide nozzle of the second spiral winding structure to synchronously and radially extend and retract, where the first radial driving unit and the second radial driving unit which are located on two sides of the rotary driving unit are connected to the rotary driving unit through two brackets;

the first radial driving unit and the second radial driving unit have the same structure, and respectively include a driving gearwheel, a first slewing bearing, a radial guide frame, and a plurality of radial sliding assemblies, where each radial sliding assembly includes a sliding block, a conveying shaft, a bevel gear rotating tube, and a sliding spline rod; the driving gearwheels are rotationally connected to frame plates on the same side through the first slewing bearings, the radial guide frames are fixedly connected to the brackets on the same side, and a plurality of guide grooves are circumferentially arrayed in each radial guide frame; the sliding blocks are disposed in the guide grooves in a sliding manner, and one side of each sliding block is provided with a cylindrical bulge matched with a curved groove of the corresponding driving gearwheel; the conveying shafts are installed in the sliding blocks through bearings, and two ends of the conveying shafts extend out of the sliding blocks; the yarn guide nozzles and the sliding spline rods are respectively connected to front ends and tail ends of the conveying shafts, inner walls of the bevel gear rotating tubes are sleeved with the sliding spline rods in a sliding manner, the brackets are provided with lantern rings for limiting the movement of the bevel gear rotating tubes along the axial directions of the brackets, bevel gears on the bevel gear rotating tubes are disposed outside the guide grooves, and a gear of each driving gearwheel is engaged with a driving mechanism; and the rotary driving unit includes inner and outer large gear rings, a second slewing bearing, and pinion synchronous transmission assemblies, where the inner and outer large gear rings are rotationally connected to one of the brackets through the second slewing bearing, and a plurality of sets of pinion synchronous transmission assemblies are distributed and engaged on outer gear rings of the inner and outer large gear rings, each pinion synchronous transmission assembly includes two small circular gears engaged with the inner and outer large gear rings and two small bevel gears respectively and vertically engaged with the bevel gears on the bevel gear rotating tubes on the two radial sliding units, the two small circular gears are in key connection and arranged side by side and are respectively connected to the small bevel gears on the same side through connecting shafts; the connecting shafts penetrate through the brackets and are installed on the brackets through bearings; and inner gear rings of the inner and outer large gear rings are engaged with another driving mechanism.

Preferably, the driving mechanism of the rotary driving unit drives the inner gear rings of the inner and outer large gear rings through engaging to rotate, outer rings of the inner and outer large gear rings drive the two small circular gears of the pinion synchronous transmission assemblies which are circumferentially and evenly distributed through engaging and drive the two small bevel gears to synchronously rotate, and the small bevel gears drive the bevel gears on the bevel gear rotating tubes on the same side through engaging to rotate, the inner walls of the bevel gear rotating tubes are sleeved with the sliding spline rods in a sliding manner, and the yarn guide nozzles are driven through the sliding spline rods to carry out self-rotation; and the driving mechanisms of the first radial driving unit and the second radial driving unit drive the corresponding driving gearwheels through engaging to rotate, and the curved grooves of the driving gearwheels drive the sliding blocks to slide along the guide grooves of the radial guide frames, the sliding blocks drive the conveying shafts, and the conveying shafts drive the sliding spine rods and the yarn guide nozzles to do radial telescopic motion.

Preferably, the yarn guide nozzles and the radial sliding assemblies are provided with channels for the fiber tows to pass through, the fiber tows are sent out from the yarn guide nozzles through the radial sliding assemblies by means of an external yarn releasing mechanism and a tension control mechanism, and the fiber tows sent out by the same set of yarn guide nozzles are synchronously converged at one place under the action of the radial sliding assemblies.

Preferably, the fiber tows are impregnated with resin when entering the channels of the radial sliding assemblies, the impregnated fiber tows are outputted after passing through the yarn guide nozzles, and electric heating elements are disposed at the yarn guide nozzles to heat the fiber tows, so that the fiber tows with the resin can be better attached to the wound containers after being heated.

Compared with the prior art, the present invention has the following beneficial effects.

1. The present invention can realize the spiral winding of the multiple bundles of fibers on the wound containers, greatly improves the spiral winding efficiency in production, and can reduce the phenomena of yarn slippage and uneven stress distribution of the fiber tows, thereby improving the load-bearing performance of the wound containers.
2. The spiral winding structure of the present invention is a double-layer structure. By judging the axial dimensions of the wound containers, single-station double-layer spiral winding or double-station single-layer spiral winding can be selected, and the winding efficiency is greatly improved compared with existing winding equipment and methods.
3. In the present invention, the feeding devices drive the wound containers to do axial reciprocating motion and axial rotation, so that the resin wound with the fibers is distributed more evenly under the action of centrifugal force on the wound containers, which can effectively reduce the resulting pore problem between the fiber layers during winding, and improve the molding stability, load-bearing performance and strength of the wound containers.
4. Compared with the traditional wire feeding device, the present invention can realize the synchronous control of the double-layer yarn guide nozzles, solve the problem of many degrees of freedom in the self-rotation control of the yarn guide nozzles, reduce the control difficulty, and improve the winding efficiency. The double-layer yarn guide nozzles circumferentially and evenly distributed can realize the function of automatic wire feeding, and can also adjust the self-rotation speed according to the winding demand to ensure the stable output of winding tension, thereby ensuring the final winding molding performance of the wound containers.
5. In the single-station double-layer spiral winding of the present invention, the wound containers can complete four layers of winding in one round trip, and progressive winding is carried out on every two layers, which can greatly reduce the phenomenon of yarn slippage of the fiber tows, avoid fiber crossing, ensure winding evenness of multiple fiber tows, and promote the efficiency of multi-bundle winding.

BRIEF DESCRIPTION OF DRAWINGS

To describe the technical solutions in the embodiments of the present invention or in the prior art more clearly, the accompanying drawings required for the embodiments will be briefly described below. Apparently, the accompanying drawings in the following description show merely some embodiments of the present invention, and a person of ordinary skill in the art may still derive other accompanying drawings from these accompanying drawings without creative efforts.

Figure 1:
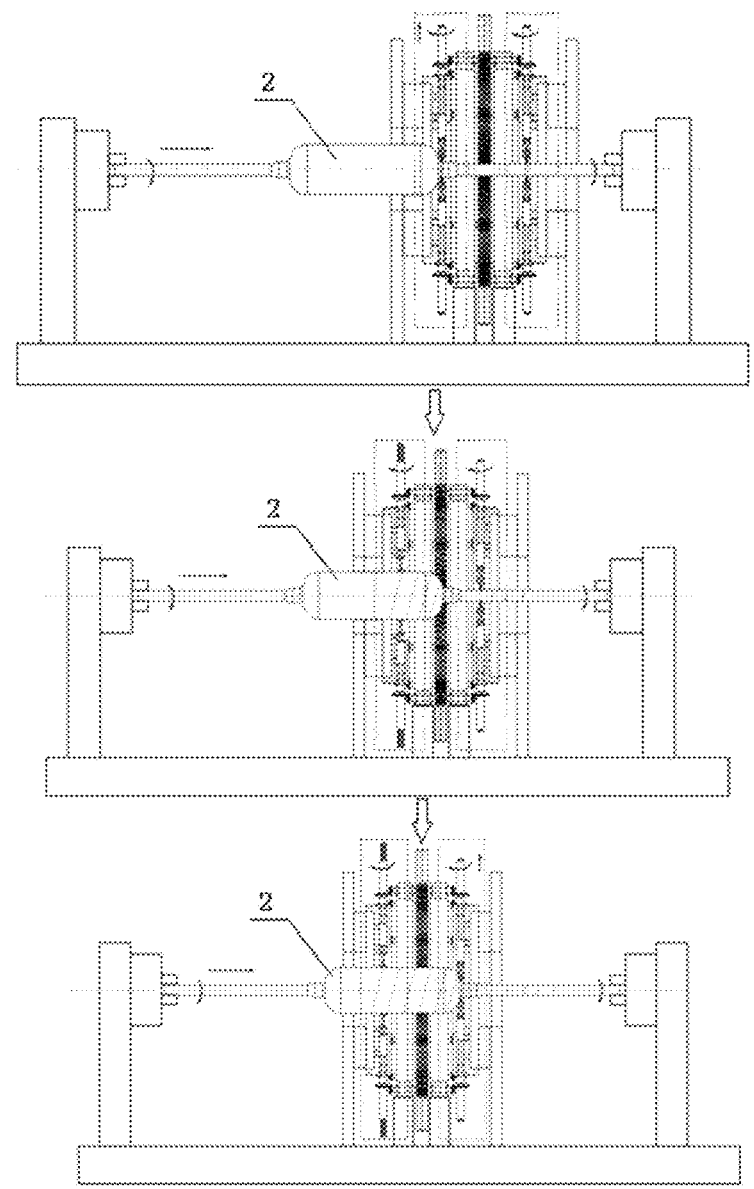
FIG. 1 is a schematic diagram of a single-station double-layer spiral winding process (from the start of the first layer of spiral winding to the start of the second layer of spiral winding)

Reference numerals: 1—yarn guide nozzle; 2—wound container; 3—bracket; 3.1—lantern ring; 4—driving gearwheel; 4.1—curved groove; 5—first slewing bearing; 6—radial guide frame; 6.1—guide groove; 7.1—sliding block; 7.2—conveying shaft; 7.3—bevel gear rotating tube; 7.4—sliding spline rod; 8—frame plate; 9—inner and outer large gear rings; 10—second slewing bearing; 11.1—small circular gear; 11.2—small bevel gear; 11.3—connecting shaft.

DETAILED DESCRIPTION OF ILLUSTRATIVE EMBODIMENTS

The technical solutions in the embodiments of the present invention are described clearly and completely with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts should fall within the protection scope of the present invention.

It should be noted that the structures, proportions, sizes, etc. shown in the drawings attached to this specification are only used to match the content disclosed in the specification, for those who are familiar with this technology to understand and read, and are not used to limit the limiting conditions under which the present invention can be implemented. Therefore, there is no technical substantive meaning. Any modification of structure, change of the proportional relationship, or adjustment of the size should still fall within the scope covered by the technical content disclosed by the present invention without affecting the effect and purpose of the present invention. It should be noted that in this specification, relational terms such as first and second are only used to distinguish one entity from several other entities without necessarily requiring or implying any such actual relationship or order between the entities.

The present invention provides an embodiment.

A method for manufacturing storage containers by spirally winding with multiple bundles of fibers is provided, fiber tows are led out of yarn guide nozzles 1, and carry out spiral winding on the surfaces of wound containers 2; two sets of yarn guide nozzles 1 distributed in a circumferential array constitute a first spiral winding structure and a second spiral winding structure respectively, and a spiral winding device with the two layers of spiral winding structures cooperates with feeding devices carrying the wound containers 2 to realize the spiral winding of the multiple bundles of fibers on the wound containers 2; the feeding devices drive the wound containers 2 to do axial reciprocating motion and axial rotation, and the spiral winding device drives the yarn guide nozzles 1 to do radial telescopic motion and self-rotation motion; and according to lengths of axial dimensions of the wound containers 2, single-station double-layer spiral winding or double-station single-layer spiral winding is selected.

When the axial dimensions of the wound containers 2 are greater than the distance between the two layers of spiral winding structures (slender type), the single-station double-layer spiral winding is selected, and the feeding devices can be a three-jaw chuck that moves in an orbit; when the sum of the axial dimensions of the two wound containers 2 are less than the distance between the two layers of spiral winding structures (short and thick type), the double-station single-layer spiral winding is selected, and the feeding devices can be a mechanical arm; and in this embodiment, the wound containers 2 can be a rotary symmetrical structural part such as a pipeline, a variety of pressure vessels (gas cylinders), a one-way plate, or an NOL ring, and the gas cylinders can be a bipolar hole container, a unipolar hole container, etc.

the spiral winding device based on the method further includes a rotary driving unit configured to drive the two sets of yarn guide nozzles 1 to carry out synchronous self-rotation, a first radial driving unit configured to drive the yarn guide nozzle 1 of the first spiral structure to synchronously and radially extend and retract, and a second radial driving unit configured to drive the yarn guide nozzle 1 of the second spiral winding structure to synchronously and radially extend and retract, where the first radial driving unit and the second radial driving unit which are located on two sides of the rotary driving unit are connected to the rotary driving unit through two brackets 3.

As shown in FIG. 5 to FIG. 8, the first radial driving unit and the second radial driving unit have the same structure, and respectively include a driving gearwheel 4, a first slewing bearing 5, a radial guide frame 6, and a plurality of radial sliding assemblies, where each radial sliding assembly includes a sliding block 7.1, a conveying shaft 7.2, a bevel gear rotating tube 7.3, and a sliding spline rod 7.4; the driving gearwheels 4 are rotationally connected to a frame plate 8 on the same side through the first slewing bearings 5, the radial guide frames 6 are fixedly connected to the bracket 3 on the same side, and a plurality of guide grooves 6.1 are circumferentially arrayed in each radial guide frame 6; the sliding blocks 7.1 are disposed in the guide grooves 6.1 in a sliding manner, and one side of each sliding block is provided with a cylindrical bulge matched with a curved groove 4.1 of the corresponding driving gearwheel 4; the conveying shafts 7.2 are installed in the sliding blocks 7.1 through bearings, and two ends of the conveying shafts extend out of the sliding blocks 7.1; the yarn guide nozzles 1 and the sliding spline rods 7.4 are respectively connected to front ends and tail ends of the conveying shafts 7.2, inner walls of the bevel gear rotating tubes 7.3 are sleeved with the sliding spline rods 7.4 in a sliding manner, the brackets 3 are provided with lantern rings 3.1 for limiting the movement of the bevel gear rotating tubes 7.3 along the axial directions of the brackets, bevel gears on the bevel gear rotating tubes 7.3 are disposed outside the guide grooves 6.1, and a gear of each driving gearwheel 4 is engaged with a driving mechanism;

the rotary driving unit includes inner and outer large gear rings 9, a second slewing bearing 10, and pinion synchronous transmission assemblies, where the inner and outer large gear rings 9 are rotationally connected to one of the brackets 3 through the second slewing bearing 10, and a plurality of sets of pinion synchronous transmission assemblies are distributed and engaged on outer gear rings of the inner and outer large gear rings 9, each pinion synchronous transmission assembly includes two small circular gears 11.1 engaged with the inner and outer large gear rings 9 and two small bevel gears 11.2 respectively and vertically engaged with the bevel gears on the bevel gear rotating tubes 7.3 on the two radial sliding units, the two small circular gears 11.1 are in key connection and arranged side by side and are respectively connected to the small bevel gear 11.2 on the same side through connecting shafts 11.3; the connecting shafts 11.3 penetrate through the brackets 3 and are installed on the brackets 3 through bearings; and inner gear rings of the inner and outer large gear rings 9 are engaged with another driving mechanism.

The working principle of the self-rotation and radial telescopic movement of the yarn guide nozzles 1 is as follows: the driving mechanism of the rotary driving unit drives the inner gear rings of the inner and outer large gear rings 9 through engaging to rotate, outer rings of the inner and outer large gear rings 9 drive the two small circular gears 11.1 of the pinion synchronous transmission assemblies which are circumferentially and evenly distributed through engaging and drive the two small bevel gears 11.2 to synchronously rotate, and the small bevel gears 11.2 drive the bevel gears on the bevel gear rotating tubes 7.3 on the same side through engaging to rotate, the inner walls of the bevel gear rotating tubes 7.3 are sleeved with the sliding spline rods 7.4 in a sliding manner, and the yarn guide nozzles 1 are driven through the sliding spline rods 7.4 to carry out self-rotation; and the driving mechanisms of the first radial driving unit and the second radial driving unit drive the corresponding driving gearwheels 4 through engaging to rotate, and the curved grooves 4.1 of the driving gearwheels 4 drive the sliding blocks 7.1 to slide along the guide grooves 6.1 of the radial guide frames 6, the sliding blocks 7.1 drive the conveying shafts 7.2, and the conveying shafts 7.2 drive the sliding spine rods 7.4 and the yarn guide nozzles 1 to do radial telescopic motion.

According to the present invention, double-layer spirally winding yarn guide nozzles 1 are adopted to feed, and the inner and outer large ring gears 9 drive the pinion synchronous transmission assemblies circumferentially and evenly distributed to ensure that the corners transmitted to the yarn guide nozzles 1 are synchronized at the same time to realize the synchronous rotation of the double-layer yarn guide nozzles 1; and the double-layer driving gearwheels 4 are driven to ensure that the radial feed of each layer of yarn guide nozzles 1 does not affect each other.

During the single-station double-layer helical winding, the winding steps include:

S101: fixing two ends of the wound containers 2 by central shaft rods of the feeding devices, and driving the wound containers 2 to rotate and axially feed by the feeding devices, starting the spiral winding from first end sealing sections of the wound containers 2 by the first spiral winding structure, and enabling the yarn guide nozzles 1 of the first spiral winding structure to cooperate with the wound containers 2 to carry out radial movement and self-rotation motion;

S102: when the first end sealing sections of the wound containers 2 are moved to the second spiral winding structure, starting second layer of winding on the wound containers 2 by the second spiral winding structure, enabling the yarn guide nozzles 1 of the second spiral winding structure to cooperate with the wound containers 2 to carry out radial movement and self-rotation motion, and winding by the first spiral winding structure to cylinder sections or second end sealing sections;

S103: continuing to carry out winding on the cylinder sections or the second end sealing sections by the first spiral winding structure until completing the winding of the second end sealing sections, thereby completing the first layer of spiral winding on the wound containers 2; and continuing to carry out winding by the second spiral winding structure until completing the second layer of spiral winding on the wound containers 2;

S104: after the second layer of spiral winding on the wound containers 2 is completed, driving the wound containers 2 to start to move and rotate by a preset angle in opposite directions of the feeding directions of the first two layers of spiral winding by the feeding devices, and completing the third and fourth layers of spiral winding on the wound containers 2 respectively by the second spiral winding structure and the first spiral winding structure, and completing the winding for the number of spiral winding layers in a setting process by parity of reasoning; and S105: after all spiral winding are completed, cutting off the fiber tows.

In step S101, in winding from the first end sealing sections to the cylinder sections of the wound containers 2 by the first spiral winding structure, the first radial driving unit and the rotary driving unit work synchronously, and the yarn guide nozzles 1 of the first spiral winding structure carry out radial retraction movement and self-rotation at the same time, so that the fiber tows are better attached to the end sealing sections according to a certain winding angle, thereby avoiding the phenomenon of crossing of multi-tow fibers; and in winding to the cylinder sections, the yarn guide nozzle 1 of the first spiral winding structure radially retracts to a certain position to stop retracting, and continues the first layer of winding on the cylinder sections along the direction of the winding angle.

Step S102 and step S103 can be further subdivided according to the axial dimensions of the wound containers 2.

Figure 2:
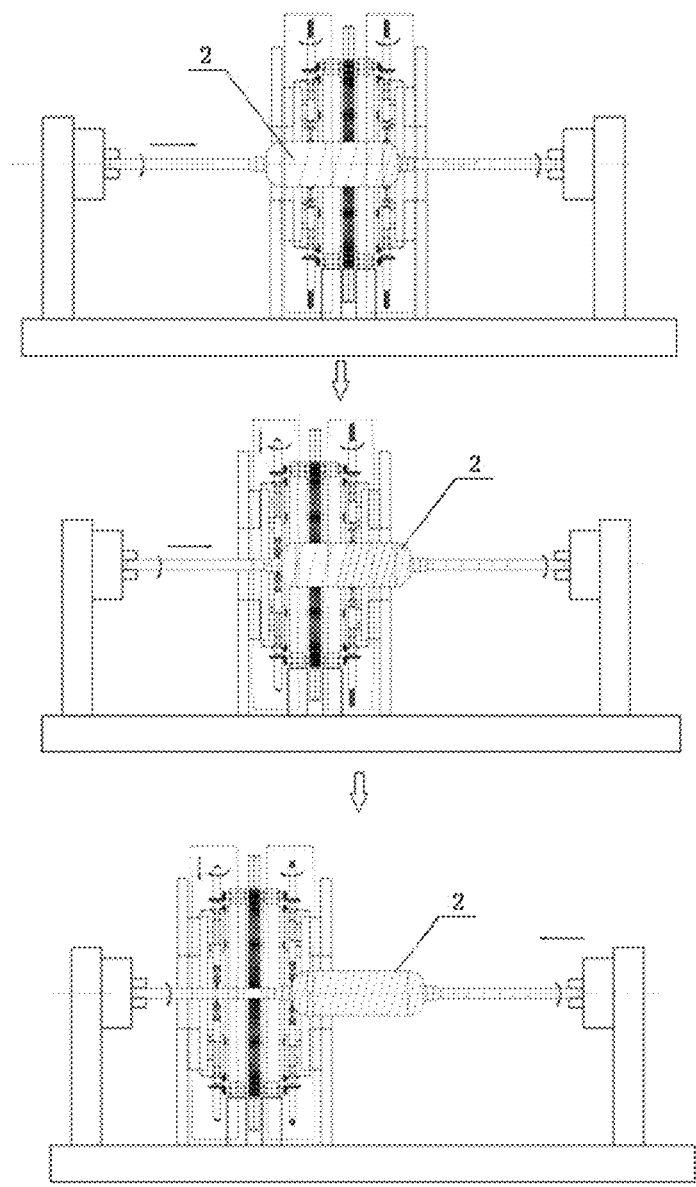
FIG. 2 is a schematic diagram of a single-station double-layer helical winding process (from the start of the second layer of spiral winding to the end of the second layer of spiral winding)
Figure 3:
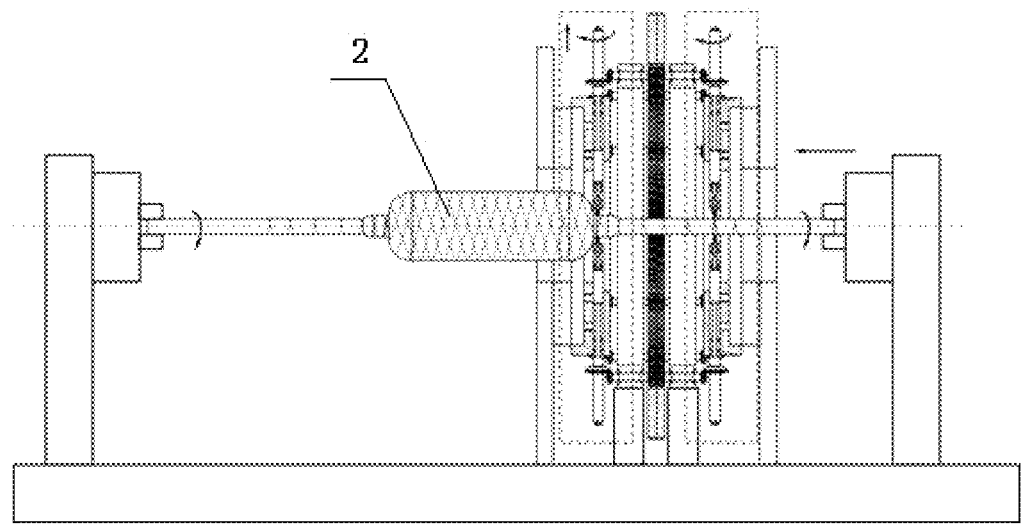
FIG. 3 is a schematic diagram of a single-station double-layer spiral winding process (the ending of the third and fourth layers of spiral winding)

As shown in FIG. 1 to FIG. 3, when the axial dimensions of the first end sealing sections and the cylinder sections are greater than the distance between the two layers of spiral winding structures, and in step S102, when the first end sealing sections of the wound containers 2 are moved to the second spiral winding structure, the second radial driving unit works to start the second spiral winding on the first end sealing sections of the wound containers 2, and at this time, the first spiral winding structure carries out winding to certain positions of the cylinder sections. In step S103, the first spiral winding structure continues to carry out winding at the cylinder sections of the wound containers 2, the second spiral winding structure carries out winding from the first end sealing sections to the cylinder sections of the wound containers 2, the yarn guide nozzle 1 of the second spiral winding structure carries out radial retraction movement and self-rotation at the same time, and when the second spiral winding structure carries out winding to the cylinder sections, the yarn guide nozzle 1 of the second spiral winding structure radially retracts to a certain position to stop retracting, and continues the second layer of winding on the cylinder sections along the direction of the winding angle; after the first spiral winding structure completes the winding on the cylinder sections of the wound containers 2, the first spiral winding structure carries out winding to the second end sealing sections of the wound containers 2, and the yarn guide nozzle 1 of the first spiral winding structure carries out radial extension movement and self-rotation at the same time until the winding on the second end sealing sections of the wound containers 2 is completed, so that the first layer of spiral winding on the wound containers 2 is realized, and the yarn guide nozzle 1 of the first spiral winding structure stops extending; and the second spiral winding structure continues to carry out winding until the second layer of winding on the cylinder sections of the wound containers 2 is completed, the second spiral winding structure continues to carry out winding to the second end sealing sections of the wound containers 2, and the yarn guide nozzle 1 of the second spiral winding structure carries out radial extension movement and self-rotation at the same time until the winding on the second end sealing sections of the wound containers 2 is completed, so that the second layer of spiral winding on the wound containers 2 is realized.

When the axial dimensions of the first end sealing sections and the cylinder sections are less than the distance between the two layers of spiral winding structures and the axial dimensions of the wound containers 2 are greater than the distance between the two layers of spiral winding structures, and in step S102, when the first end sealing sections of the wound containers 2 are moved to the second spiral winding structure, the second radial driving unit works to start the second spiral winding of the first end sealing sections of the wound containers 2, and at this time, the first spiral winding structure carries out winding to the certain positions of the second end sealing sections. In step S103, the first spiral winding structure carries out winding along the second end sealing sections of the wound containers 2, and the yarn guide nozzle 1 of the first spiral winding structure carries out radial extension movement and self-rotation at the same time until the winding of the second end sealing sections of the wound containers 2 is completed, so that the first layer of spiral winding on the wound containers 2 is realized, and the yarn guide nozzle 1 of the first spiral winding structure stops extending; the second spiral winding structure carries outs winding from the first end sealing sections to the cylinder sections of the wound containers 2, the yarn guide nozzle 1 of the second spiral winding structure carries out radial retraction movement and self-rotation at the same time, and when the second spiral winding structure carries out winding to the cylinder sections, the yarn guide nozzle 1 of the second spiral winding structure radially retracts to a certain position to stop retracting, and continues the second layer of winding on the cylinder sections along the direction of the winding angle; and the second spiral winding structure continues to carry out winding until the second layer of winding on the cylinder sections of the wound containers 2 is completed, the second spiral winding structure continues to carry out winding to the second end sealing sections of the wound containers 2, the yarn guide nozzle 1 of the second spiral winding structure carries out radial extension movement and self-rotation at the same time until the winding of the second end sealing sections of the wound containers 2 is completed, so that the second layer of spiral winding on the wound containers 2 is realized.

In step S104, after the second layer of spiral winding is completed, the wound containers 2 are rotated by a preset angle, and the second winding is carried out in the opposite direction, so that the third and fourth layers of spiral winding of the wound containers 2 can be realized; and two layers of spiral winding can be completed at a time, and other layers of spiral winding is carried out in turn.

The single-station double-layer spiral winding container can complete four layers of winding in one round trip, and every two layers are wound progressively, which greatly reduces the phenomenon of yarn slippage of the fiber tows, avoids fiber crossing, ensures the evenness of fiber multi-tow winding, and improves multi-bundle winding efficiency.

Figure 4:
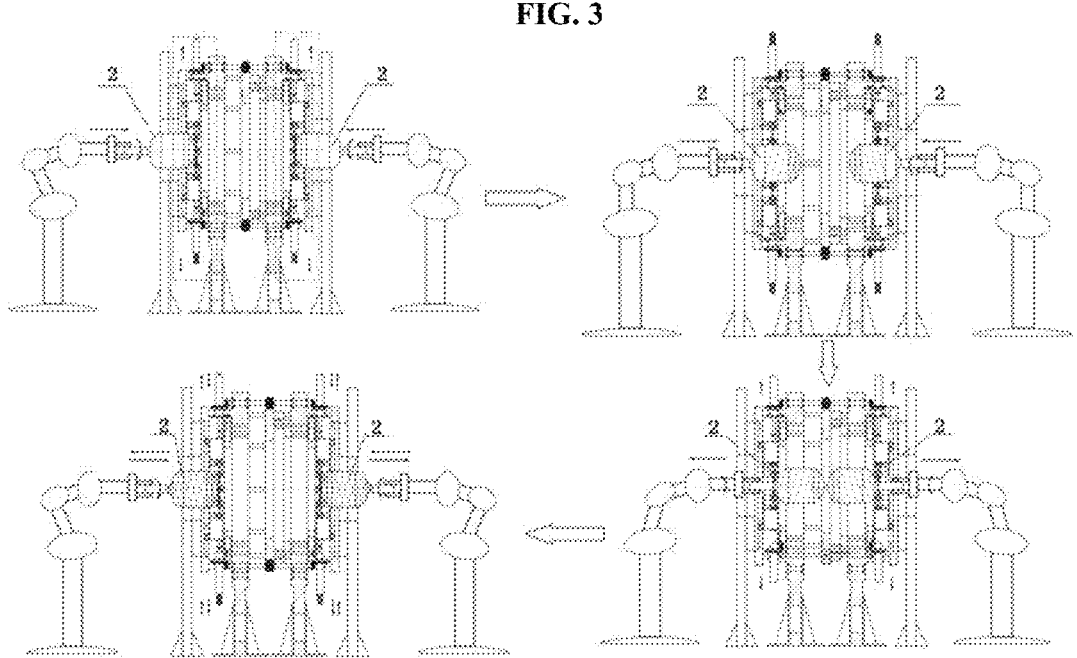
FIG. 4 is a schematic diagram of a double-station single-layer spiral winding process.
Figure 5:
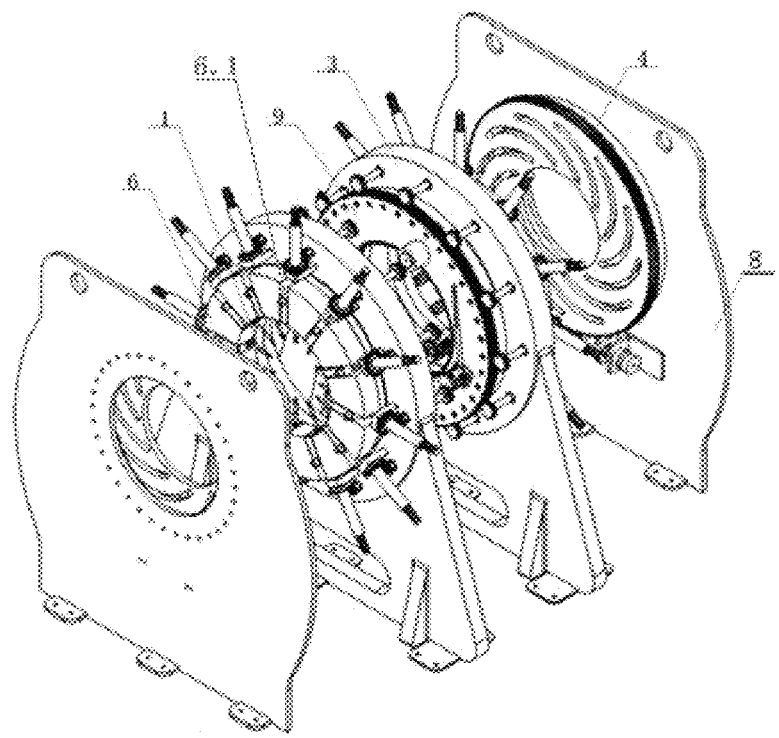
FIG. 5 is a schematic exploded view of an overall structure of the present invention.
Figure 6:
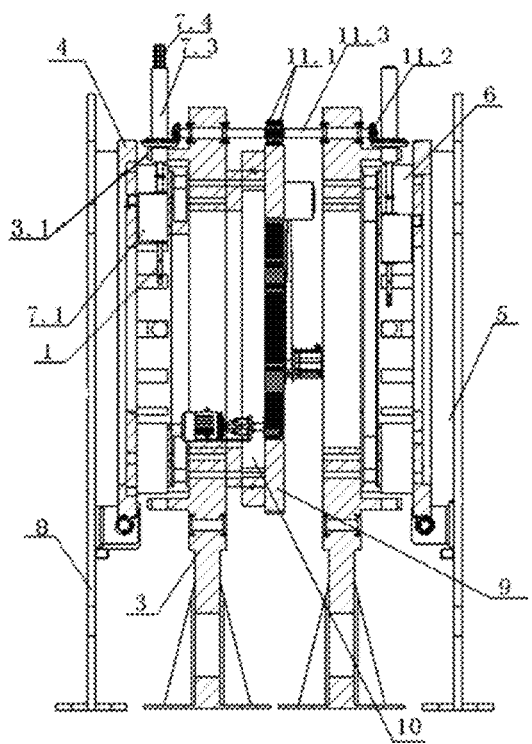
FIG. 6 is a cross-sectional view of the present invention.
Figure 7:
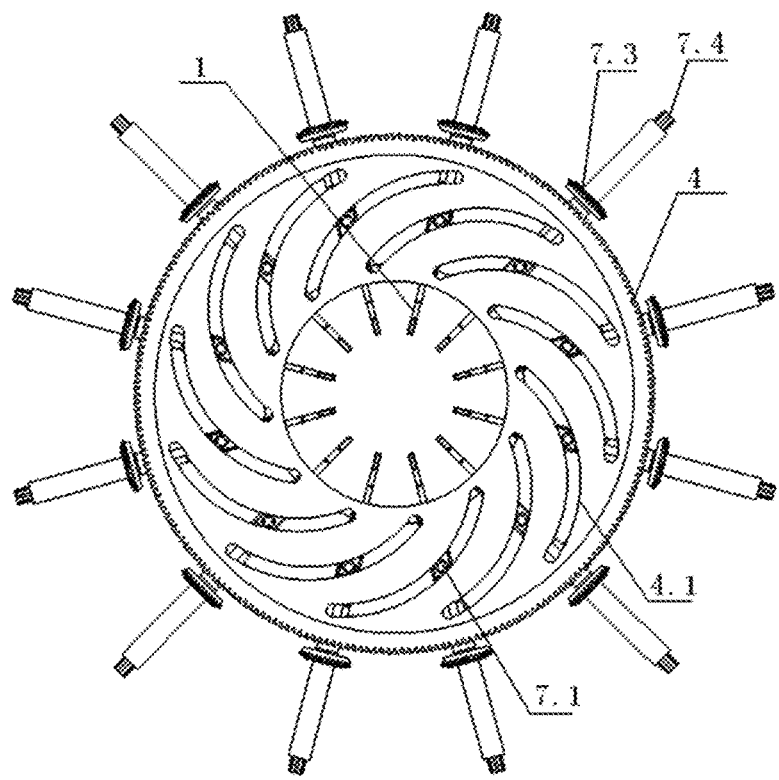
FIG. 7 is a schematic structural view of a drive gearwheel of the present invention.
Figure 8:
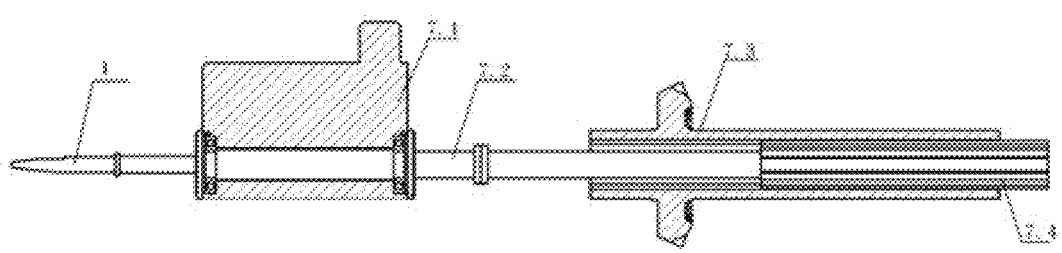
FIG. 8 is a schematic diagram of an inner structure of a radial sliding assembly of the present invention.

As shown in FIG. 4, during the double-station single-layer helical winding, the winding steps include:

S201: driving one wound container 2 to rotate and axially feed respectively by the two feeding devices located on two sides of the spiral winding structure, starting the spiral winding from the first end sealing section of one of the wound containers 2 by the first spiral winding structure, and starting the spiral winding from the first end sealing section of the other wound container 2 by the second spiral winding structure;

S202: under the radial movement and self-rotation motion of the yarn guide nozzle 1 of the first spiral winding structure, in cooperation with the rotation and axial feeding of the corresponding wound containers 2, completing the winding of the second end sealing sections of the wound containers 2 by the first spiral winding structure, thereby completing the first layer of spiral winding of the wound containers 2, and changing the axial feeding directions of the wound containers 2 into the opposite directions until completing the second layer of spiral winding of the wound containers 2 by the first spiral winding structure;

under the radial movement and self-rotation motion of the yarn guide nozzle 1 of the second spiral winding structure, in cooperation with the rotation and axial feeding of the corresponding wound containers 2, completing the winding of the second end sealing sections of the wound containers 2 by the second spiral winding structure, thereby completing the first layer of spiral winding of the wound containers 2, and changing the axial feeding directions of the wound containers 2 into the opposite directions until completing the second layer of spiral winding of the wound containers 2 by the second spiral winding structure;

S203: completing the winding for the set number of spiral winding process layers of the two wound containers 2 by parity of reasoning and reciprocating circulation; and S204: after all spiral winding are completed, cutting off the fiber tows.

Since the clamping method is that one end is fixed, and the distance between the two layers of spiral winding structures is limited, the double-station single-layer spiral winding method has certain restrictions on the weight and shape of the wound containers 2, and the sum of the axial lengths of the two wound containers 2 should be less than the distance between the spiral winding structures, so that the double-station single-layer spiral winding method is suitable for short and thick containers and containers with short cylinders; and the multi-bundle winding process adopted in this method can ensure that there will be no crossing, overlapping and overhead between the same layers of spiral winding, reduces the gap of the fiber tows, enables the fiber tows to be closely attached to the surfaces of the wound containers 2 under good impregnation conditions, at the same time greatly reduces the generation of pores, and not only improves the fiber winding efficiency, but also improves the winding molding performance and load-bearing strength of the wound containers 2 compared with the single-bundle fiber winding process.

In this embodiment, the yarn guide nozzles 1 and the radial sliding assemblies are provided with channels for the fiber tows to pass through, the fiber tows are sent out from the yarn guide nozzles 1 through the radial sliding assemblies by means of an external yarn releasing mechanism and a tension control mechanism, and the fiber tows sent out by the same set of yarn guide nozzles 1 are synchronously converged at one place under the action of the radial sliding assemblies, the radial movement of the yarn guide nozzles 1 cooperates with the self-rotation motion to complete the curved surface spiral winding of the wound containers 2, the distance between the fiber tows of the fibers impregnated with the resin on the surfaces of the wound containers 2 needs to be ensured to be minimized on the premise of not affecting the winding process, so as to ensure the stability of winding molding, and the tension control mechanism can improve the precise control capability on the tension of the fiber tows and improve the winding molding quality.

The fiber tows are impregnated with resin when entering the channels of the radial sliding assemblies, and the impregnated fiber tows are outputted after passing through the yarn guide nozzles 1, and electric heating elements are disposed at the yarn guide nozzles 1 to heat the fiber tows, so that the fiber tows with the resin can be better attached to the wound containers 2 after being heated so as to achieve a curing effect; and the yarn guide nozzles 1 are fixedly connected to the conveying shafts 7.2 through bolts, so that the spiral winding device cannot be impregnated with the resin.

The above is only the preferred specific embodiments of the present invention, but the protection scope of the present invention is not limited to this. Any A changes or substitutions that may be easily conceived by those skilled in the art within the technical scope disclosed by the present invention should be covered within the protection scope of the present invention. Therefore, the protection scope of the present invention should be subjected to the protection scope of the claims.

What is claimed is:

1. A method for manufacturing storage containers by spirally winding with multiple bundles of fibers, the method comprising:

spirally winding the storage containers with the multiple bundles of fibers to form wound containers by:
leading fiber tows out of yarn guide nozzles for carrying out spiral winding on surfaces of the storage containers,
wherein two sets of the yarn guide nozzles are distributed in a circumferential array in which a first set of the two sets constitute a first spiral winding structure and a second set of the two sets constitute a second spiral winding structure, and
wherein a spiral winding device with the first and second spiral winding structures cooperates with feeding devices carrying the storage containers so as to realize at least two layers of the spiral winding of the multiple bundles of fibers on the storage containers;

rotating the storage containers about an axis of the spiral winding device and moving the storage containers along an axial direction of the spiral winding device by the feeding devices; and driving the spiral winding device to (i) move the first set of the yarn guide nozzles along a radial direction of first spiral winding structure and the second set of the yarn guide nozzles along a radial direction of second spiral winding structure, and (ii) rotate the yarn guide nozzles about their respective axes;

wherein the spiral winding device further comprises:
a rotary driving unit configured to drive the two sets of the yarn guide nozzles to rotate about their respective axes synchronously,
a first radial driving unit configured to drive the first set of the yarn guide nozzles of the first spiral winding structure to synchronously extend and retract the first set of the yarn guide nozzles along the radial direction of the first spiral winding structure, and
a second radial driving unit configured to drive the second set of the yarn guide nozzles of the second spiral winding structure to synchronously extend and retract the second set of the yarn guide nozzles along the radial direction of the second spiral winding structure, wherein the first radial driving unit and the second radial driving unit are located on two sides of the rotary driving unit and are connected to the rotary driving unit through two brackets, respectively;

wherein the first radial driving unit and the second radial driving unit have the same structure, and respectively comprise:
a driving gearwheel,
a first slewing bearing,
a radial guide frame, and
a plurality of radial sliding assemblies, wherein each of the plurality of radial sliding assemblies comprises:
a sliding block,
a conveying shaft,
a bevel gear rotating tube, and
a sliding spline rod;

wherein the driving gearwheels of the first and second radial driving units are rotationally connected to frame plates on first sides of the driving gearwheels through the first slewing bearings, respectively;

wherein the radial guide frames of the first and second radial driving units are fixedly connected to the two brackets on second sides of the driving gearwheels opposite to the first sides, respectively, and a plurality of guide grooves is circumferentially arrayed in each of the radial guide frames of the first and second radial driving units;

wherein the sliding blocks are disposed in the plurality of guide grooves in a sliding manner, respectively, and one side of each of the sliding blocks is provided with a cylindrical bulge matched with a curved groove of the corresponding driving gearwheel;

wherein each of the conveying shafts is installed in a corresponding sliding block of the sliding blocks through first bearings, and two ends of said each of the conveying shafts extend out of the corresponding sliding block of the sliding blocks;

wherein a corresponding yarn guide nozzle of the yarn guide nozzles and a corresponding sliding spline rod of the sliding spline rods are respectively connected to a front end and a tail end of a corresponding conveying shaft of the conveying shafts, each of inner walls of the bevel gear rotating tubes is sleeved with a corresponding sliding spline rod of the sliding spline rods in a sliding manner, the two brackets are provided with lantern rings for limiting movements of the bevel gear rotating tubes along the axial direction of the brackets, bevel gears on each of the bevel gear rotating tubes are disposed outside the plurality of guide grooves, and a respective gear of said each of the driving gearwheels is engaged with a driving mechanism;

wherein the rotary driving unit comprises:
inner and outer large gear rings,
a second slewing bearing, and
pinion synchronous transmission assemblies;

wherein the inner and outer large gear rings are rotationally connected to one of the two brackets through the second slewing bearing, and a plurality of sets of the pinion synchronous transmission assemblies is distributed and engaged on outer gear rings of the inner and outer large gear rings;

wherein each of the pinion synchronous transmission assemblies comprises:
two small circular gears engaged with the inner and outer large gear rings, and
two small bevel gears respectively and vertically engaged with the bevel gears on the bevel gear rotating tubes on two of the plurality of radial sliding assemblies of the first and second radial driving units;

wherein the two small circular gears are in key connection and arranged side by side and are respectively connected to the two small bevel gears on outer sides of the two small circular gears through connecting shafts;

wherein the connecting shafts penetrate through the two brackets and are installed on the two brackets through second bearings; and wherein inner gear rings of the inner and outer large gear rings are engaged with another driving mechanism.

2. The method according to claim 1, further comprising:
selecting single-station double-layer spiral winding or double-station single-layer spiral winding for the spiral winding based on axial dimensions of the storage containers,
wherein in response to the axial dimension of one of the storage containers being greater than a distance between the first and second spiral winding structures, the single-station double-layer spiral winding is selected; and
wherein in response to a sum of the axial dimensions of the two storage containers being less than the distance between the first and second spiral winding structures, the double-station single-layer spiral winding is selected.

3. The method according to claim 2, wherein the single-station double-layer spiral winding is selected, wherein during the single-station double-layer spiral winding, winding steps comprise:
fixing two ends of the storage containers by central shaft rods of the feeding devices, rotating and moving the storage containers by the feeding devices toward the second spiral winding structure, and driving the spiral winding device to start a first layer of the spiral winding from first end sealing sections of the storage containers by the first spiral winding structure, wherein the yarn guide nozzles of the first spiral winding structure move along the radial direction of the first spiral winding structure and rotate about their respective axes in cooperation with the storage containers;

in response to the first end sealing sections of the storage containers being moved to the second spiral winding structure, driving the spiral winding device to start a second layer of the spiral winding on the storage containers by the second spiral winding structure, wherein the yarn guide nozzles of the second spiral winding structure move along the radial direction of the second spiral winding structure and rotate about their respective axes in cooperation with the storage containers;

continuing to spiral wind the storage containers toward cylinder sections or second end sealing sections of the storage containers by the first spiral winding structure until completing the spiral winding of the second end sealing sections, thereby completing the first layer of spiral winding on the storage containers, and continuing to spiral wind by the second spiral winding structure until completing the second layer of spiral winding on the storage containers;

after the second layer of spiral winding of the containers is completed,
  starting to move and rotate the storage containers by a preset angle in opposite directions of feeding directions of the first two layers of spiral winding by the feeding devices,
  completing third and fourth layers of spiral winding of the storage containers respectively by the second spiral winding structure and the first spiral winding structure, and
  completing the spiral winding for a set number of spiral winding layers; and cutting off the fiber tows.

4. The method according to claim 2, wherein the double-station single-layer spiral winding is selected, wherein during the double-station single-layer spiral winding, winding steps comprise:
  rotating and moving two storage containers of the storage containers by two feeding devices of the feeding devices, wherein the two feeding devices are located on two sides of the spiral winding device, respectively;
  driving the spiral winding device to start a first layer of the spiral winding from a first end sealing section of one of the two storage containers by the first spiral winding structure, and start a first layer of the spiral winding from a first end sealing section of the other of the two storage containers by the second spiral winding structure;
  during the yarn guide nozzles of the first spiral winding structure moving along the radial direction of the first spiral winding structure and rotating about their respective axes in cooperation with the rotation and the movement of the one of the two storage containers in the axial direction,
    completing the spiral winding of a second end sealing section of the one of the two storage containers by the first spiral winding structure, thereby completing the first layer of spiral winding of the one of the two storage containers, and
    changing an axial feeding direction of the one of the two storage containers into an opposite direction until completing a second layer of spiral winding of the one of the two storage containers by the first spiral winding structure; and
  during the yarn guide nozzles of the second spiral winding structure moving along the radial direction and rotating about their respective axes in cooperation with the rotation and the movement of the other of the two storage containers in the axial direction,
    completing the spiral winding of a second end sealing section of the other of the two storage containers by the second spiral winding structure, thereby completing the first layer of spiral winding of the other of the two storage containers, and
    changing an axial feeding direction of the other of the two storage containers into an opposite direction until completing a second layer of spiral winding of the other of the two storage containers by the second spiral winding structure;
  completing the spiral winding for a set number of spiral winding layers of the two storage containers; and
  cutting off the fiber tows.

5. The method according to claim 1,
wherein the another driving mechanism drives the inner gear rings of the inner and outer large gear rings,
the outer gear rings of the inner and outer large gear rings drive the two small circular gears of the pinion synchronous transmission assemblies,
the two small circular gears are circumferentially and evenly distributed drive the two small bevel gears to synchronously rotate,
the two small bevel gears drive the bevel gears on the bevel gear rotating tubes to rotate, and
the yarn guide nozzles are driven through the sliding spline rods to rotate about their respective axes; and
driving mechanisms of the first radial driving unit and the second radial driving unit drive the corresponding driving gearwheels to rotate, and the curved grooves of the driving gearwheels drive the sliding blocks to slide along the guide grooves of the radial guide frames, the sliding blocks drive the conveying shafts, and the conveying shafts drive the sliding spine rods and the yarn guide nozzles to move along the radial directions of first and second spiral winding structures.

6. The method according to claim 5,
wherein the yarn guide nozzles and the plurality of radial sliding assemblies are provided with channels for the fiber tows to pass through, the fiber tows are sent out from the yarn guide nozzles through the plurality of radial sliding assemblies by means of an external yarn releasing mechanism and a tension control mechanism, the fiber tows sent out by the first set of the yarn guide nozzles are synchronously converged at a center of the first spiral winding structure under an action of the plurality of radial sliding assemblies of the first radial driving unit, and the fiber tows sent out by the second set of the yarn guide nozzles are synchronously converged at a center of the second spiral winding structure under an action of the plurality of radial sliding assemblies of the second radial driving unit.

7. The method according to claim 6, wherein the fiber tows are impregnated with resin when entering the channels of the plurality of radial sliding assemblies, the impregnated fiber tows are outputted after passing through the yarn guide nozzles, and electric heating elements are disposed at the yarn guide nozzles to heat the fiber tows, so that the fiber tows with the resin are attached to the containers after being heated.

* * * * *